US011675398B2

(12) United States Patent
Chang et al.

(10) Patent No.: US 11,675,398 B2
(45) Date of Patent: Jun. 13, 2023

(54) SNAP RIVETS FOR SECURING PRINTED CIRCUIT BOARD ASSEMBLIES

(71) Applicant: QUANTA COMPUTER INC., Taoyuan (TW)

(72) Inventors: Chun Chang, Taoyuan (TW); Kai-Yuan Chuang, Taoyuan (TW); Wei-Pin Chen, Taoyuan (TW); Jyue Hou, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/410,650

(22) Filed: Aug. 24, 2021

(65) Prior Publication Data

US 2023/0060228 A1    Mar. 2, 2023

(51) Int. Cl.
*G06F 1/18* (2006.01)
*F16B 19/08* (2006.01)

(52) U.S. Cl.
CPC .............. *G06F 1/185* (2013.01); *F16B 19/08* (2013.01); *G06F 1/181* (2013.01)

(58) Field of Classification Search
CPC ........... G06F 1/185; G06F 1/181; F16B 19/08
See application file for complete search history.

(56) References Cited

U.S. PATENT DOCUMENTS

| 2,620,538 | A | * | 12/1952 | Poupitch | F16B 5/10 |
| | | | | | 470/49 |
| 5,568,675 | A | * | 10/1996 | Asami | F16B 19/1081 |
| | | | | | 24/297 |
| 6,780,115 | B2 | * | 8/2004 | Schmieding | A61B 17/866 |
| | | | | | 606/86 R |
| 2017/0277230 | A1 | * | 9/2017 | Samper | H05K 7/1405 |

FOREIGN PATENT DOCUMENTS

EP    0984527 A2    3/2020

OTHER PUBLICATIONS

TW Office Action for Application No. 111103488, dated Jun. 27, 2022, w/ First Office Action Summary.

* cited by examiner

*Primary Examiner* — Anthony Q Edwards
*Assistant Examiner* — Hung Q Dang
(74) *Attorney, Agent, or Firm* — Nixon Peabody LLP (57) ABSTRACT

A system includes a computing system, a snap rivet, and a printed circuit board assembly (PCBA). The computing system includes a chassis. The snap rivet includes a rivet and a cap, and the cap is secured to the chassis. The PCBA includes a pin base. The pin base has a washer portion with a hole. The pin base is configured to receive the cap through the hole. The cap protrudes through the hole and mechanically engages the rivet to secure the PCBA to the chassis. The snap rivet provides for tool-less installation and removal of the PCBA from the chassis of the computing system.

20 Claims, 7 Drawing Sheets

SNAP RIVETS FOR SECURING PRINTED CIRCUIT BOARD ASSEMBLIES

FIELD OF THE INVENTION

The present invention relates generally to systems and methods for securing printed circuit board assemblies within a housing of a computing system, and more specifically, to snap rivets for tool-less fixing of the printed circuit board assemblies.

BACKGROUND OF THE INVENTION

Computing systems (e.g., desktop computers, blade servers, rack-mount servers, etc.) are employed in large numbers in various applications. Computing systems include one or more printed circuit boards (PCBs) with electronic components (e.g., resistors, capacitors, inductors, transistors, integrated circuits, transformers, etc.). These PCBs with assembled components are termed printed circuit board assemblies (PCBAs). PCBAs are an important part of computing systems (e.g., servers). PCBAs are typically secured to chassis or motherboard trays of servers using screws. Users can often lose the screws that secure the PCBAs during maintenance or assembly of servers. Losing fixing components like screws of a PCBA can lead to damage of a server during transportation. Thumb screws have been proposed as a replacement for typical screws, but thumb screws are costly when compared to screws.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system includes a computing system, a snap rivet, and a printed circuit board assembly (PCBA). The computing system includes a chassis. The snap rivet includes a rivet and a cap, and the cap is secured to the chassis. The PCBA includes a pin base. The pin base has a washer portion with a hole. The pin base is configured to receive the cap through the hole. The cap protrudes through the hole and mechanically engages the rivet to secure the PCBA to the chassis.

In an implementation, the rivet is attached to the pin base using a flexible arm. In an implementation, the pin base includes one or more loop portions extending from the washer portion. The one or more loop portions is configured to receive a screw for attaching the pin base to the PCBA. In an implementation, a height of the washer portion is greater than a height of the one or more loop portions. In an implementation, the pin base includes one or more tabs. The one or more tabs provide a surface area for gluing the pin base to the PCBA. In an implementation, the washer portion includes a gradation such that a diameter of the hole in the washer portion of the pin base changes as a function of a height of the washer portion.

In an implementation, the cap includes a plurality of structural members. Each of the structural members has a stem, a ridge, a groove, and a tip. The PCBA is configured to be secured at the stems of the structural members when the PCBA is secured to the chassis, and the ridges of the structural members prevent the PCBA from dislodging from the cap. In an implementation, the rivet includes a plurality of hooks that engage the grooves of the structural members, such that the tips of the structural members prevent the rivet from dislodging from the grooves of the structural members. In an implementation, the plurality of hooks is arranged around a major axis of a longitudinal member of the rivet. In an implementation, the rivet includes a longitudinal member configured to engage with each of the structural members in the plurality of structural members, preventing the each of the structural members from bending. In an implementation, the rivet includes a cylindrical header and a cylindrical hook base connected with a cylindrical transition portion, and a diameter of the cylindrical transition portion is smaller than the diameters of both the cylindrical hook base and the cylindrical header. In an implementation, the cap is a metal component or a plastic component. In an implementation, the pin base is secured to the PCBA using hooks or glue.

According to certain aspects of the present disclosure, a snap rivet for a computing system with a chassis includes a rivet and a cap. The rivet has a longitudinal member. The cap has a plurality of structural members. Each structural member of the plurality of structural members has a stem, a ridge, a groove, and a tip. The longitudinal member engages each structural member such that bending of each structural member is prevented.

In an implementation, each of the structural members is separated by spacing and extending from a trunk of the cap. In an implementation, the structural members are configured to bend due to the spacing in order to facilitate securing and dislodging the PCBA from the cap. In an implementation, the cap protrudes through a hole provided on the PCBA when the longitudinal member is engaged to each of the structural members. In an implementation, the rivet includes a plurality of hooks. The rivet is secured to at least one of the grooves of the cap via the hooks. In an implementation, the rivet is connected to a portion of a PCBA using a flexible arm. In an implementation, at least one of the cap or the rivet is metal.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Embodiments of the present disclosure provide snap rivets for securing PCBAs in computing systems. The snap rivets improve serviceability by preventing issues associated with screws (e.g., lost screws, tool-dependency for securing the screws, etc.). The snap rivets are also cost efficient when compared to thumb screws. A snap rivet, according to some implementations of the present disclosure, is configured to engage with a cap. The snap rivet and the cap have a tight fit that secures the PCBA to a chassis of the computing system. As such, this results in tool-less maintenance and reduced costs when compared to thumb screws.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
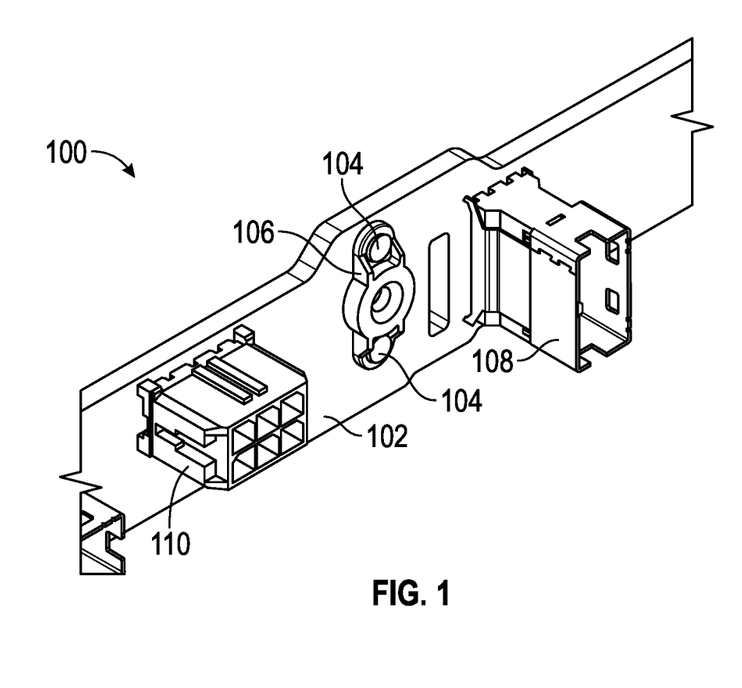
FIG. 1 is a perspective view showing a printed circuit board assembly (PCBA), according to certain aspects of the present disclosure.

Referring to FIG. 1, a printed circuit board assembly (PCBA) 100, according to some implementations of the present disclosure, is provided. The PCBA 100 includes a printed circuit board (PCB) 102 with two connectors 108 and 110 mounted on the PCB 102. The connectors 108 and 110 are merely provided as examples, but the PCBA can include microcontrollers, integrated circuits, resistors, surface mounted capacitors, etc. The PCBA further includes a pin base 106. The pin base 106 is secured to the PCBA 100 using screws 104. The screws 104 are merely provided as an example, and other methods (e.g., glue, hooks, etc.) can be used to secure the pin base 106 to the PCBA 100.

Figure 2:
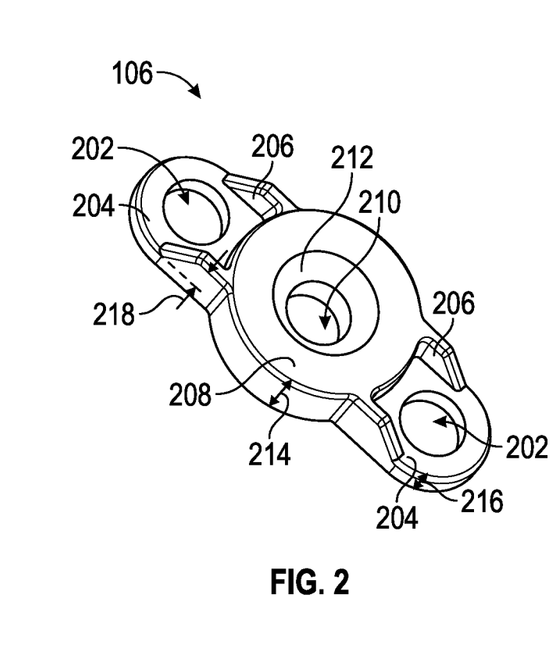
FIG. 2 is a perspective view of a pin base, according to certain aspects of the present disclosure.

Referring to FIG. 2, the pin base 106, according to some implementations of the present disclosure, is provided. The pin base 106 includes at least one loop portion 204 with at least one hole 202 for receiving the screws 104 (FIG. 1) for securing the pin base 106 to the PCB 102. The loop portion 204 extends from a washer portion 208 of the pin base 106. The washer portion 208 has a height 214 that larger than a height 216 of the loop portion 204, as shown in FIG. 2. The pin base 106 includes transition flats 206 that provide structural support, adding additional contacts between the loop portion 204 and the washer portion 208. The transition flats 206 have a height 218 that is less than the height 214 of the washer portion 208. The washer portion 208 has a hole 210 for receiving a cap (not shown). The washer portion 208 can include a gradation 212 such that a diameter of the hole 210, formed by the washer portion 208, changes along the height 214 of the washer portion 208. The hole 210 can be a countersink hole.

Figure 11:
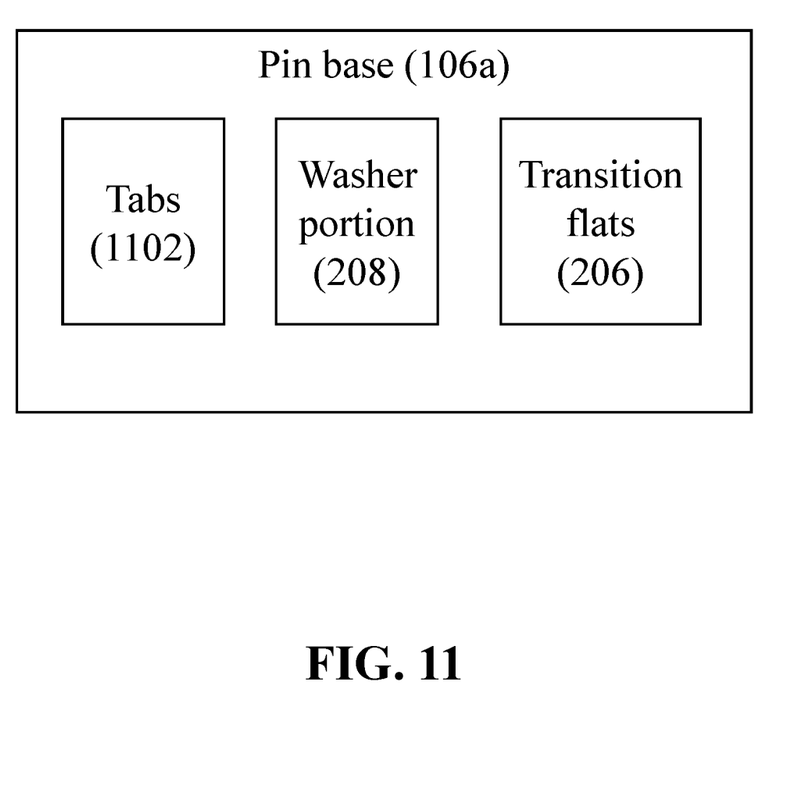
FIG. 11 is a block diagram of a pin base, according to certain aspects of the present disclosure.

In some implementations, the loop portions 204 extending from the washer portion 208 have the same height. In this implementation, the transition flats 206 are omitted. In some implementations, only one loop portion 204 is included in the pin base 106. In some implementations, more than two loop portions 204 (e.g., three loop portions, four loop portions, etc.) are provided. In some implementations, the loop portion 204 is replaced with a tab (not shown) extending from the washer portion 208. The tab has no holes and can provide a larger surface area (compared to the loop portion 204) for gluing the pin base 106 to the PCB 102. FIG. 11 provides a block diagram of a pin base 106a with tabs 1102. The loop portion 204 has a smaller outer diameter compared to the outer diameter of the washer portion 208. The loop portion 204 can have a larger inner diameter compared to the smallest inner diameter of the washer portion 208.

Figure 3:
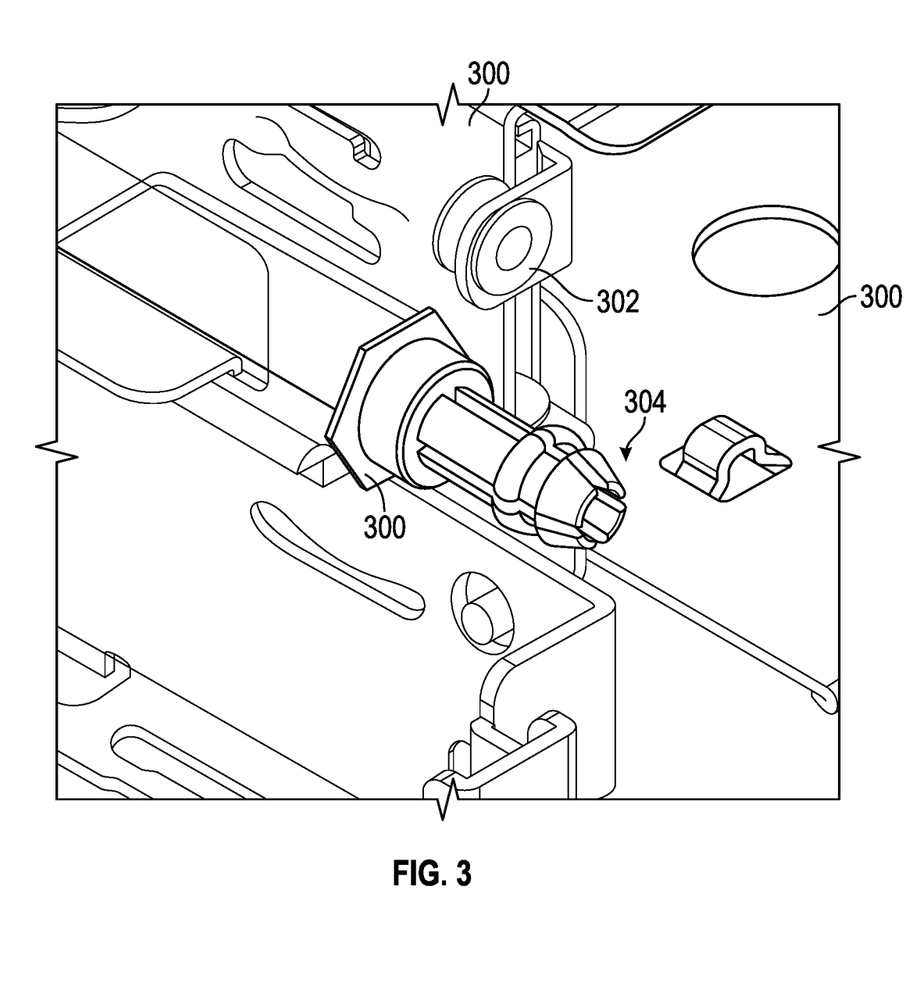
FIG. 3 is a perspective view of a cap pressed on a chassis of a computing system, according to certain aspects of the present disclosure.

Referring to FIG. 3, a chassis 300 of a computing system with an installed cap 304 is provided. The chassis 300 can also include a stopper 302. In some implementations, the cap 304 is metal that is pressed on the chassis 300. In some implementations, the cap 304 is a plastic component that is glued to the chassis 300.

Figure 4:
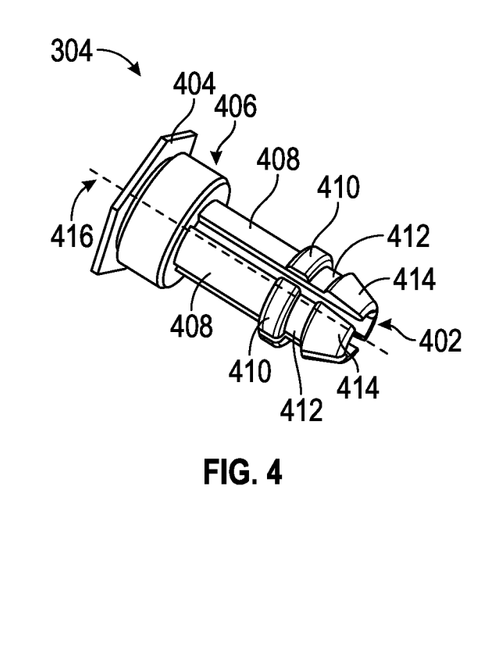
FIG. 4 is a perspective view of the cap of FIG. 3, according to certain aspects of the present disclosure.

FIG. 4 provides a perspective view of the cap 304. The cap 304 includes a flat bottom 404, a trunk 406, and at least one structural member 402 extending from the trunk 406. The flat bottom 404 can have a hexagonal shape to facilitate pressing on the cap 304 to the chassis 300 (FIG. 3). The trunk 406, connected to the flat bottom 404, is cylindrical, as shown in FIG. 4; however, in some implementations, the trunk 406 can be a rectangular prism. The trunk 406 provides a thick base for attaching each of the structural members 402. Each of the structural members 402 is identical, and includes a stem 408, a ridge 410, a groove 412, and a tip 414.

The structural members 402 are arranged about a center axis 416 of the cap 304. In some implementations, a spacing exists between each of the structural members 402, such that the structural members 402 do not touch each other. The spacing allows for slight bends along the length of the structural members 402, such that the tip 414 of at least one of the structural members 402 is brought closer to the tip 414 of another one of the structural members 402. This bending allows for changing a radius of a circle formed by the tips 414 of the structural members 402.

Although four structural members 402 are provided in FIG. 4, in some implementations, the number of structural members can be one, two, three, five, six, etc. In the case of one structural member, the material used should be compressible or deformable in order to accommodate changing of the radius of the circle formed by the tip of the structural member. The stem 408 of the structural member 402 provides a region where a PCB (not shown) can be secured. The trunk 406 and the ridge 410 prevent the PCB (not shown) from dislodging from the stem 408. Similarly, the groove 412 of the structural member 402 provides a region where a rivet (not shown) can engage the cap 304. The tip 414 and the ridge 410 prevent the rivet (not shown) from dislodging from the cap 304. The tip 414 can be sloped to facilitate sliding the PCB (not shown) onto the stem 408.

Figure 5:
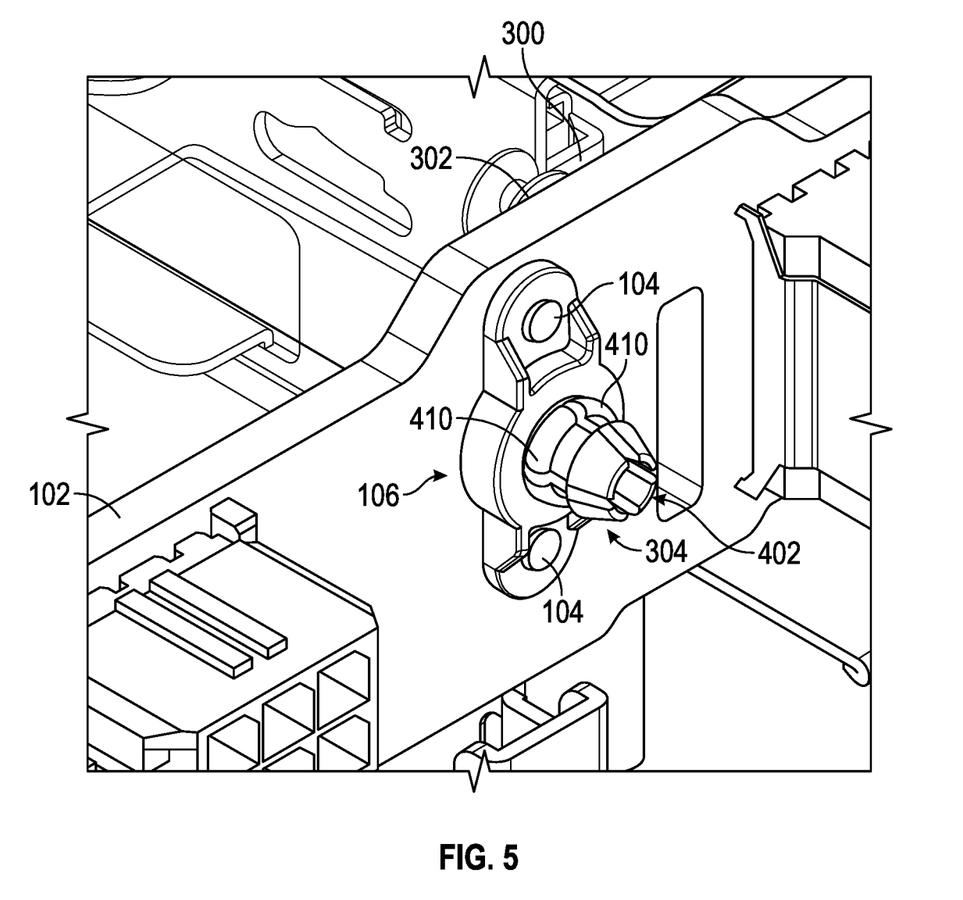
FIG. 5 is a perspective view of the PCBA of FIG. 1 installed on the chassis of the computing system of FIG. 3, according to certain aspects of the present disclosure.

Referring to FIG. 5, the PCB 102 is engaged to the cap 304 using the pin base 106. The pin base 106 is pressed on the chassis 300, as illustrated in FIG. 3. The pin base 106 on the PCB 102 is matched to the cap 304, such that the structural members 402 of the cap 304 engage with the hole 210 (FIG. 2) of the pin base 106. The hole 210 (FIG. 2) transitions from a smaller diameter to a larger diameter from the perspective of the cap 304. Thus, while installing the PCB 102 on the chassis 300, the structural members 402 of the cap 304 are initially squeezed together and then released once the pin base 106 clears the ridges 410. The ridges 410 can sit in the larger diameter portion of the hole 210 (FIG. 2) without the structural members 402 being squeezed together. The PCB 102 is supported on the stems 408 of the structural members 402, and the ridges 410 prevent the PCB 102 from dislodging from the stems 408.

Figure 6:
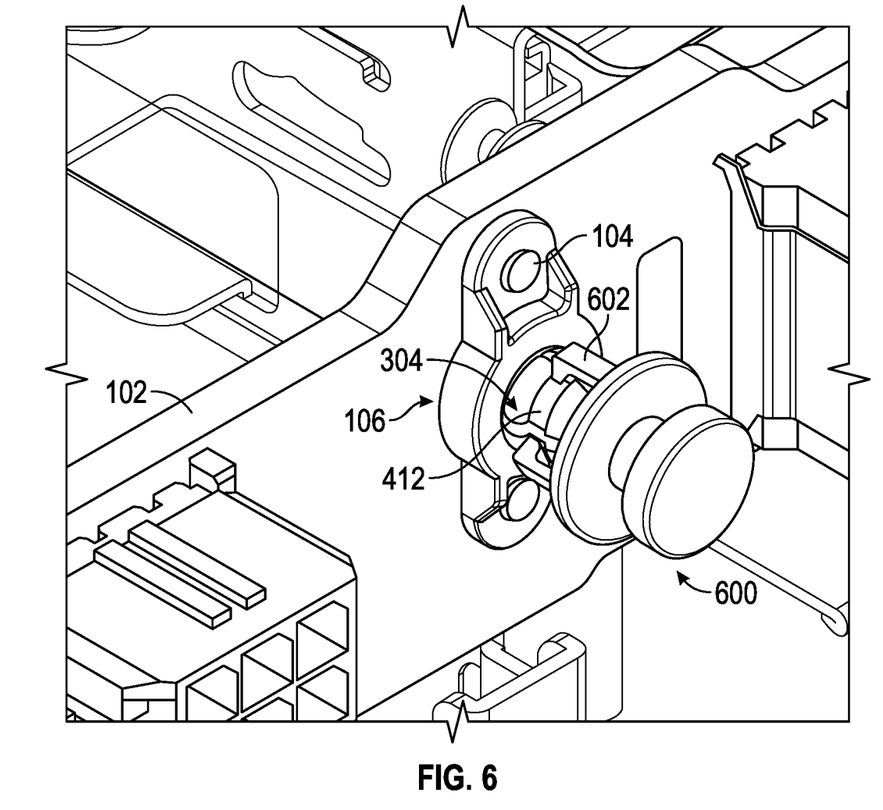
FIG. 6 is a perspective view of a rivet engaging with the cap of FIG. 3, according to certain aspects of the present disclosure.
Figure 7:
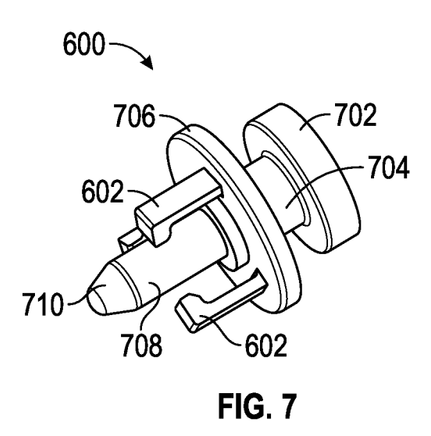
FIG. 7 is a perspective view of the rivet of FIG. 6, according to certain aspects of the present disclosure.

After the PCB 102 is received on the cap 304 at the location of the pin base 106, FIG. 6 illustrates that a rivet 600 can engage the cap 304 to further prevent the PCB 102 from dislodging from the cap 304. The cap 304 and the rivet 600 constitute a snap rivet. The rivet 600 includes one or more hooks 602 that latch onto areas of the groove 412 of at least one of the structural members 402 (FIG. 4) of the cap 304. FIG. 7 illustrates a perspective view of the rivet 600.

The rivet 600 includes a longitudinal member 708 and a header 702. The header 702 is connected to a hook base 706 through a transition portion 704. The transition portion 704, the header 702, and the hook base 706 can be cylindrical in nature with the transition portion 704 having the smallest diameter. The header 702 has a larger diameter than the transition portion 704 for facilitating removal and placement of the rivet 600 on the cap 304 (FIG. 6). Overhanging portions of the header 702 can be easily handled by a human hand or by a robotic tool to easily remove the rivet 600 from the cap 304 (FIG. 6). The hooks 602 on the rivet 600 extend from a hook base 706. The longitudinal member 708 also extends from the hook base 706. The longitudinal member 708 can have a narrowed tip 710 to facilitate engagement with the cap 304. The hooks 602 are arranged around a major axis of the longitudinal member 708.

Figure 8:
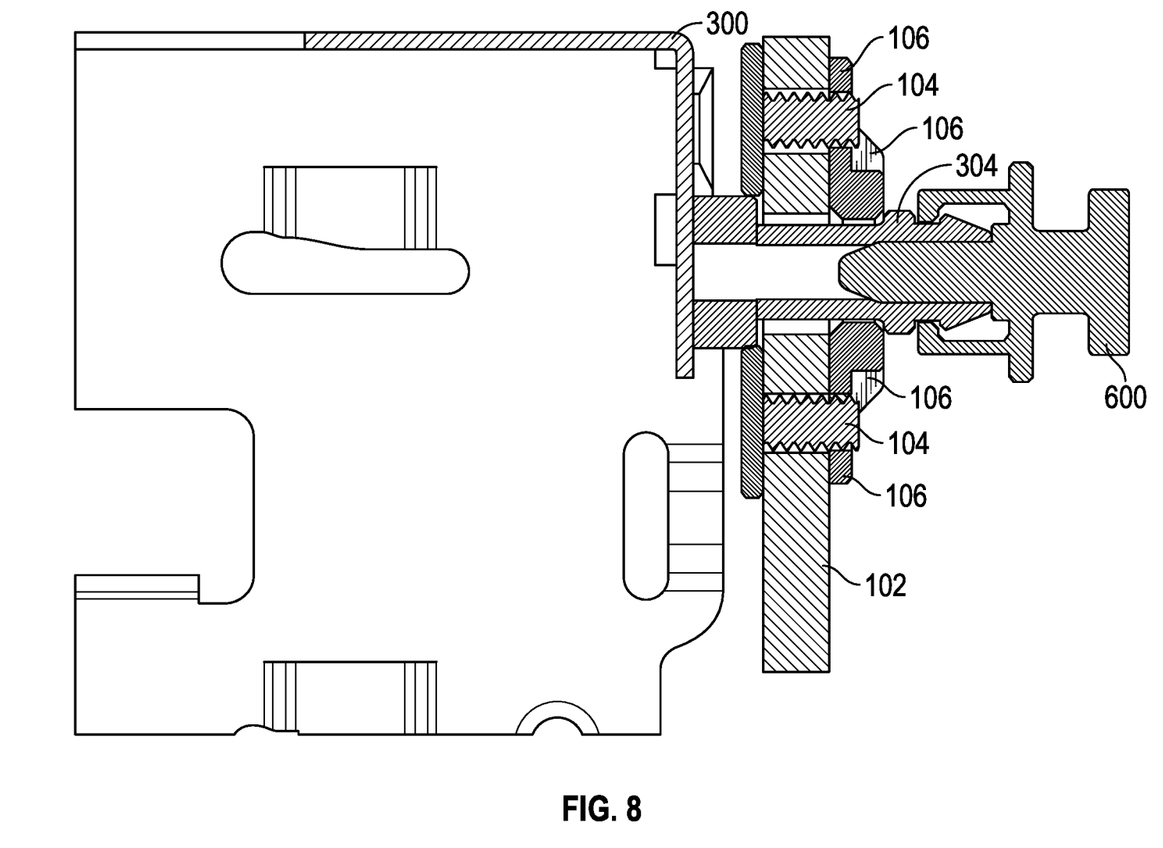
FIG. 8 is a cross sectional view of the rivet of FIG. 6 engaged with the cap of FIG. 6, according to certain aspects of the present disclosure.

FIG. 8 is a cross sectional view of the rivet 600 engaged to the cap 304, according to some implementations of the present disclosure. The cap 304 is attached to the chassis 300. The cap 304 goes through the PCB 102. The screws 104 secure the pin base 106 to the PCB 102. The longitudinal member 708 of the rivet 600 prevents the structural members 402 (FIG. 4) of the cap 304 from bending, thus ensuring the hooks 602 (FIG. 6) remain in the grooves 412 (FIG. 6) and that the ridges 410 prevent the PCB 102 from sliding along the length of the cap 304.

Figure 9:
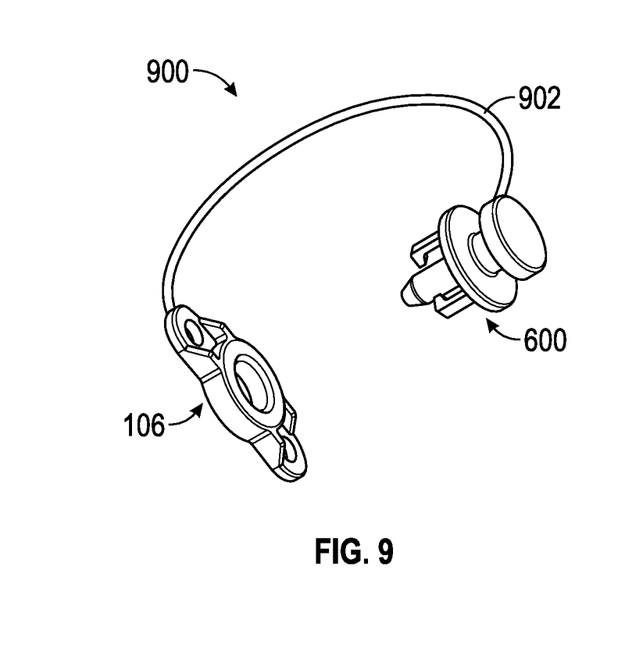
FIG. 9 is a perspective view of a rivet and pin base combination, according to certain aspects of the present disclosure.
Figure 10:
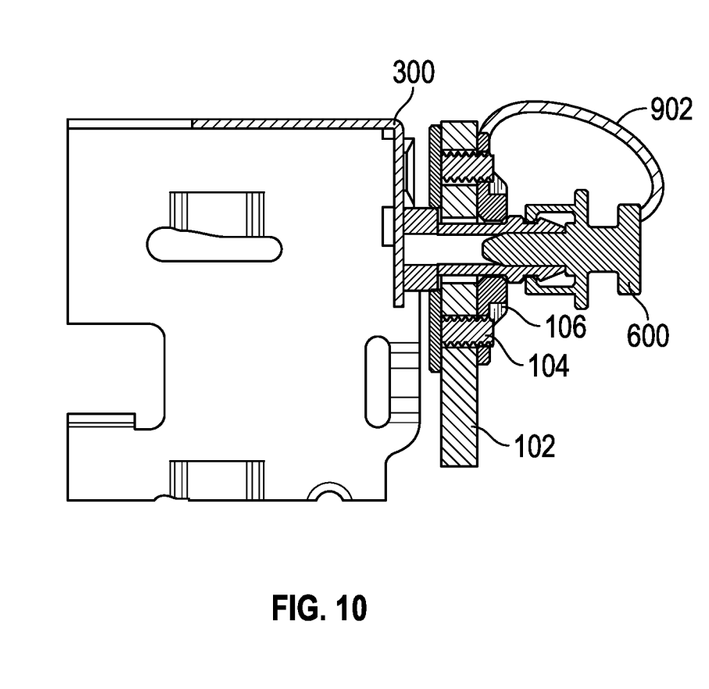
FIG. 10 is a cross sectional view of the rivet and pin base combination of FIG. 9 being used to secure a PCB, according to certain aspects of the present disclosure.

FIG. 9 illustrates a rivet-and-pin-base combination 900 that can be installed on a PCB (e.g., the PCB 102 of FIG. 1). In some implementations, to prevent loss of the rivet 600, a flexible arm 902 can be used to pair the rivet 600 and the pin base 106. During removal of PCBAs, paired rivets will remain with the PCBA rather than being placed separately. FIG. 10 is a cross-sectional view of the rivet-and-pin-base combination 900 being used to secure the PCB 102 to the chassis 300, according to certain aspects of the present disclosure.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system comprising:
   a computing system including a chassis;
   a snap rivet including a rivet and a cap, a first end of the cap being secured to the chassis, and the cap having an exterior surface with varying diameters along the length of the cap; and
   a printed circuit board assembly (PCBA) including a pin base, the pin base having a washer portion with a hole, the pin base being configured to receive a second end of the cap through the hole, the second end of the cap protruding through the hole such that the rivet mechanically engages the exterior surface of the cap to secure the PCBA to the chassis.

2. The system of claim 1, wherein the rivet is directly attached to the pin base using a flexible arm.

3. The system of claim 1, wherein the pin base includes one or more loop portions extending from the washer portion, the one or more loop portions configured to receive a screw for attaching the pin base to the PCBA.

4. The system of claim 3, wherein a height of the washer portion is greater than a height of the one or more loop portions.

5. The system of claim 1, wherein the pin base includes one or more tabs, the one or more tabs providing a surface area for gluing the pin base to the PCBA.

6. The system of claim 1, wherein the washer portion includes a gradation such that a diameter of the hole in the washer portion of the pin base changes as a function of a height of the washer portion.

7. The system of claim 1, wherein the cap includes a plurality of structural members, each of the structural members having a stem, a ridge, a groove, and a tip, wherein the PCBA is configured to be secured at the stems of the structural members when the PCBA is secured to the chassis, the ridges of the structural members preventing the PCBA from dislodging from the cap.

8. The system of claim 7, wherein the rivet includes a plurality of hooks that engage the grooves of the structural members such that the tips of the structural members prevent the rivet from dislodging from the grooves of the structural members.

9. The system of claim 8, wherein the plurality of hooks is arranged around a major axis of a longitudinal member of the rivet.

10. The system of claim 7, wherein the rivet includes a longitudinal member configured to engage with each of the structural members in the plurality of structural members, the longitudinal member preventing each of the structural members from bending.

11. The system of claim 7, wherein the rivet includes a cylindrical header and a cylindrical hook base that is connected with a cylindrical transition portion, a diameter of the cylindrical transition portion being smaller than diameters of both the cylindrical hook base and the cylindrical header.

12. The system of claim 1, wherein the cap is a metal component or a plastic component.

13. The system of claim 1, wherein the pin base is secured to the PCBA using hooks or glue.

14. A snap rivet for a computing system with a chassis, the snap rivet comprising:
a rivet having a longitudinal member; and
a cap having a plurality of structural members extending from a first end of the cap to form an interior surface and an exterior surface, each structural member of the plurality of structural members having a stem, a ridge, a groove, and a tip,
wherein each stem is attached to the first end of the cap and the cap is configured to receive the longitudinal member from a second end opposite the first end, and the longitudinal member is configured to engage each structural member along the interior surface of the cap such that bending of each structural member is prevented, and
wherein the rivet is configured to engage the grooves of the cap along the exterior surface.

15. The snap rivet of claim 14, wherein each of the structural members is separated by spacing and extending from a trunk of the cap.

16. The snap rivet of claim 15, wherein the structural members are configured to bend due to the spacing in order to facilitate securing and dislodging a printed circuit board assembly (PCBA) from the cap.

17. The snap rivet of claim 16, wherein the cap protrudes through a hole provided on the PCBA when the longitudinal member is engaged to each of the structural members.

18. The snap rivet of claim 14, wherein the rivet includes a plurality of hooks and wherein the rivet is secured to at least one of the grooves of the cap via the hooks.

19. The snap rivet of claim 18, wherein the rivet is directly connected to a portion of a PCBA using a flexible arm.

20. The snap rivet of claim 14, wherein at least one of the cap or the rivet is metal.

* * * * *